United States Patent
Yoshimori et al.

(10) Patent No.: US 10,660,149 B2
(45) Date of Patent: May 19, 2020

(54) COMPUTER-READABLE MEDIUM, COMMUNICATION TERMINAL, AND METHOD FOR PERFORMING APPROPRIATE COMMUNICATION EVEN AFTER UPDATING OF IDENTIFICATION INFORMATION

(71) Applicant: BROTHER KOGYO KABUSHIKI KAISHA, Nagoya-shi, Aichi (JP)

(72) Inventors: Satoshi Yoshimori, Nagoya (JP); Takafumi Kai, Nagoya (JP)

(73) Assignee: Brother Kogyo Kabushiki Kaisha, Nagoya-shi, Aichi (JP)

( * ) Notice: Subject to any disclaimer, the term of this patent is extended or adjusted under 35 U.S.C. 154(b) by 0 days.

(21) Appl. No.: 16/441,263

(22) Filed: Jun. 14, 2019

(65) Prior Publication Data

US 2020/0084817 A1 Mar. 12, 2020

(30) Foreign Application Priority Data

Sep. 7, 2018 (JP) .................................. 2018-167840

(51) Int. Cl.
*H04W 76/18* (2018.01)
*H04W 76/11* (2018.01)
(Continued)

(52) U.S. Cl.
CPC ............ *H04W 76/18* (2018.02); *H04W 76/11* (2018.02); *H04W 76/14* (2018.02); *G06F 3/1236* (2013.01); *G06F 3/1292* (2013.01)

(58) Field of Classification Search
CPC ..... H04W 76/18; H04W 76/14; H04W 76/11; G06F 3/1236; G06F 3/1292
(Continued)

(56) References Cited

U.S. PATENT DOCUMENTS

| 2010/0225951 A1* | 9/2010 | Koshigaya | ............ G06F 3/1203 358/1.14 |
| 2016/0286343 A1* | 9/2016 | Terashita | ................ H04W 4/80 |
| 2018/0035377 A1* | 2/2018 | Ueda | ................ H04W 52/0235 |

FOREIGN PATENT DOCUMENTS

JP 2018-026806 A 2/2018

* cited by examiner

Primary Examiner — Edward F Urban
Assistant Examiner — Angelica M Perez
(74) Attorney, Agent, or Firm — Scully, Scott, Murphy & Presser, PC

(57) ABSTRACT

A non-transitory computer-readable medium stores computer-readable instructions that, when executed by a processor, cause a communication terminal to receive identification information from one or more communication devices via a communication interface, each identification information being periodically updated by a corresponding communication device, store first identification information into a memory, the first identification information being received from a specified communication device, perform communication with the specified communication device via the communication interface by using the stored first identification information, after disconnection of the communication, determine whether to use the first identification information or second identification information to reestablish the communication, the second identification information being transmitted by the specified communication device after the disconnection of the communication, when determining to use the first identification information, reestablish the communication using the first identification information, and when determining to use the second identification information, reestablish the communication using the second identification information.

8 Claims, 6 Drawing Sheets

(51) Int. Cl.
*H04W 76/14* (2018.01)
*G06F 3/12* (2006.01)

(58) Field of Classification Search
USPC .............................................. 455/41.1–41.3
See application file for complete search history.

COMPUTER-READABLE MEDIUM, COMMUNICATION TERMINAL, AND METHOD FOR PERFORMING APPROPRIATE COMMUNICATION EVEN AFTER UPDATING OF IDENTIFICATION INFORMATION

CROSS-REFERENCE TO RELATED APPLICATION

This application claims priority under 35 U.S.C. § 119 from Japanese Patent Application No. 2018-167840 filed on Sep. 7, 2018. The entire subject matter of the application is incorporated herein by reference.

BACKGROUND

Technical Field

Aspects of the present disclosure are related to a non-transitory computer-readable medium, a communication terminal, and a method for communicating with a communication device by using identification information of the communication device.

Related Art

Heretofore, various wireless communication technologies have been proposed. As an example of the technologies, Bluetooth (registered trademark) Low Energy (hereinafter referred to as "BLE") has been known that enables a communication terminal to perform wireless communication with a communication device by using identification information of the communication device.

SUMMARY

In the above-exemplified technology, the identification information used for the BLE communication is periodically updated by the communication device. Therefore, the communication terminal is desired to certainly perform appropriate communication with the communication device even after the identification information is updated.

Aspects of the present disclosure are advantageous to provide one or more improved techniques for a communication terminal to certainly perform appropriate communication with a communication device even after updating of identification information.

According to aspects of the present disclosure, a non-transitory computer-readable medium is provided, which stores computer-readable instructions that are executable by a processor coupled with a communication terminal including a communication interface and a memory. The instructions are configured to, when executed by the processor, cause the communication terminal to receive identification information from one or more communication devices via the communication interface, each identification information being periodically updated by a corresponding one of the one or more communication device, store first identification information into the memory, the first identification information being the identification information received from a specified one of the one or more communication devices, perform communication with the specified communication device via the communication interface by using the first identification information stored in the memory, after disconnection of the communication using the first identification information, determine whether to use the first identification information or second identification information to reestablish the communication with the specified communication device, the second identification information being identification information to be transmitted by the specified communication device after the disconnection of the communication, when determining to use the first identification information, reestablish the communication with the specified communication device by using the first identification information, and when determining to use the second identification information, reestablish the communication with the specified communication device by using the second identification information.

According to aspects of the present disclosure, further provided is a communication terminal including a communication interface, a memory, and a controller. The controller is configured to receive identification information from one or more communication devices via the communication interface, each identification information being periodically updated by a corresponding one of the one or more communication device, store first identification information into the memory, the first identification information being the identification information received from a specified one of the one or more communication devices, perform communication with the specified communication device via the communication interface by using the first identification information stored in the memory, after disconnection of the communication using the first identification information, determine whether to use the first identification information or second identification information to reestablish the communication with the specified communication device, the second identification information being identification information to be transmitted by the specified communication device after the disconnection of the communication, when determining to use the first identification information, reestablish the communication with the specified communication device by using the first identification information, and when determining to use the second identification information, reestablish the communication with the specified communication device by using the second identification information.

According to aspects of the present disclosure, further provided is a method implementable on a processor coupled with a communication terminal including a communication interface and a memory. The method includes receiving identification information from one or more communication devices via the communication interface, each identification information being periodically updated by a corresponding one of the one or more communication device, storing first identification information into the memory, the first identification information being the identification information received from a specified one of the one or more communication devices, performing communication with the specified communication device via the communication interface by using the first identification information stored in the memory, after disconnection of the communication using the first identification information, determining whether to use the first identification information or second identification information to reestablish the communication with the specified communication device, the second identification information being identification information to be transmitted by the specified communication device after the disconnection of the communication, when determining to use the first identification information, reestablishing the communication with the specified communication device by using the first identification information, and when determining to use the second identification information, reestablishing the communication with the specified communication device by using the second identification information.

BRIEF DESCRIPTION I/F THE ACCOMPANYING DRAWINGS

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Figure 1:
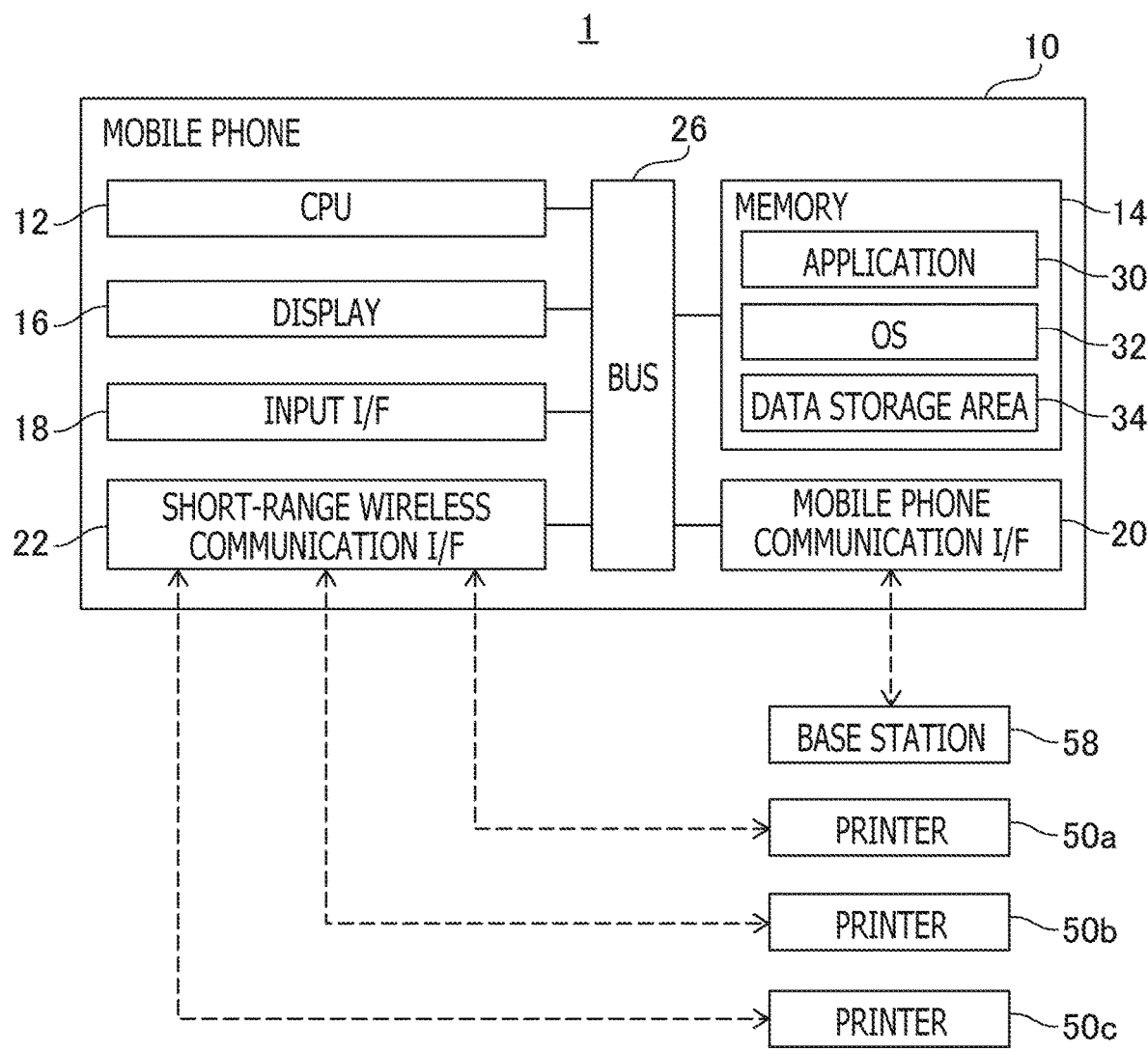
FIG. 1 is a block diagram schematically showing a configuration of a communication system in an illustrative embodiment according to one or more aspects of the present disclosure.

Hereinafter, an illustrative embodiment according to aspects of the present disclosure will be described with reference to the accompanying drawings. FIG. 1 is a block diagram schematically showing a configuration of a communication system 1 of the illustrative embodiment. As shown in FIG. 1, the communication system 1 includes a mobile phone 10 and printers 50a, 50b, and 50c.

The mobile phone 10 includes a CPU 12, a memory 14, a display 16, an input I/F ("I/F" is an abbreviation of "interface") 18, a mobile phone communication I/F 20, and a short-range wireless communication I/F 22. These elements included in the mobile phone 10 are communicably interconnected via a bus 26.

The CPU 12 is configured to perform processing according to an application 30 and an OS 32 stored in the memory 14. The application 30 is a program for causing a printer 50 to perform image formation. The OS 32 is a program to provide basic functions usable by the application 30. In the illustrative embodiment, for instance, Android (registered trademark) may be employed as the OS 32. It is noted that, hereinafter, the CPU 12 executing a program such as the application 30 may be merely referred to as a name of the program. For instance, in the following descriptions, an expression "the application 30" may implicitly denote "the CPU 12 executing the application 30."

The memory 14 has a data storage area 34. The data storage area 34 is an area to store various types of data such as data necessary for execution of the application 30. The memory 14 may include at least one of storage devices such as a RAM, a ROM, a flash memory, an HDD, and a buffer for the CPU 12.

The memory 14 may include one or more non-transitory computer-readable storage media. Examples of the non-transitory computer-readable storage media may include, but are not limited to, a CD-ROM and a DVD-ROM besides the above-exemplified storage devices. The non-transitory computer-readable storage media are tangible media. Meanwhile, electric signals carrying programs downloaded from a server on the Internet may be classified as computer-readable signal media but are not included in the non-transitory computer-readable storage media.

The display 16 is configured to display various kinds of information for the mobile phone 10. The display 16 may be any type of display such as an LCD and an organic EL display as long as the display 16 is mountable on the mobile phone 10. The input I/F 18 may include keys for executing functions of the mobile phone 10. For instance, the input I/F 18 may include a touch panel integrated with the display 16. In this case, the input I/F 18 may be configured to accept a user operation to each icon displayed on the display 16. Additionally or alternatively, the input I/F 18 may include hard keys.

The mobile phone communication I/F 20 is configured to perform wireless communication with a base station 58 in accordance with a mobile phone communication protocol. Hence, when brought into a state wirelessly communicable according to the mobile phone communication protocol, the mobile phone 10 may perform data communication via the base station 58.

The short-range wireless communication I/F 22 is configured to perform BLE communication based on IEEE 802.15.1 standard or other equivalent standards. It is noted that "BLE" is an abbreviation of "Bluetooth (registered trademark) Low Energy." Hence, when brought into a state wirelessly communicable in accordance with a BLE protocol, the mobile phone 10 may perform data communication with the printers 50.

The following descriptions mainly set forth processes by the CPU 12 in accordance with computer-readable program instructions. Namely, in the following descriptions, processes such as "judging," "determining," "extracting," "selecting," "specifying," "calculating," "obtaining," "acquiring," "accepting," "receiving," "transmitting," and "controlling" represent processes by the CPU 12. The processes by the CPU 12 may include hardware control via the OS 32. It is noted that "obtaining" or "acquiring" may be used as a concept that does not necessarily need a request. Namely, a process of the CPU 12 receiving data without making a request for the data may be contained in a concept "the CPU 12 obtains/acquires the data." Further, "data" to be referred to in the following descriptions may be expressed as a computer-readable bit string. Further, two or more pieces of data having substantially the same value but having respective different formats may be treated as the same data. The same applies to "information." Further, processes such as "instructing," "responding," and "requesting" may be performed by transmitting information representing an "instruction," a "response," and a "request." Further, processes such as "setting" and "configuring" may be performed by storing input setting information into a memory (e.g., the memory 14).

In the communication system 1 configured as above, the mobile phone 10 transmits print image data to a printer 50 via the BLE communication, and the printer 50 performs image formation based on the received print image data. Hereinafter, processes in the communication system 1 will be described.

First, via the BLE communication according to one of the NFC standards, each printer 50 transmits a beacon signal referred to as an "advertising packet." The advertising packet is not transmitted to a specified device but is concurrently transmitted to a plurality of unspecified devices. Namely, the advertising packet is broadcasted.

The advertising packet includes a random address and a local name. The random address is an address used for communication with a corresponding printer 50 that has transmitted the relevant advertising packet. The random address is periodically updated by the printer 50. Specifically, the random address is updated after a lapse of 15 minutes since disconnection of the BLE communication with the printer 50. Further, the local name is information for identifying the corresponding printer 50 that has transmitted the relevant advertising packet. Unlike the random address, the local name is not periodically updated. The local name may be any type of information as long as the local name can discriminate the corresponding printer 50 from the other printers 50. For instance, the local name may include at least one of, preferably both of, a model name and a serial number of the corresponding printer 50.

Then, the OS 32 of the mobile phone 10 receives the advertising packet from the printer 50. In this regard, nonetheless, the OS 32 does not always receive the advertising packet but receives the advertising packet only when the OS 32 is in a scan state where the OS 32 is allowed to receive the advertising packet. Then, after the OS 32 in the scan state receives the advertising packet, the OS 32 stores the received advertising packet into the data storage area 34, and establishes the BLE communication with the printer 50 by using the random address (hereinafter, which may be referred to as the "stored random address") included in the stored advertising packet.

Thus, in the communication system 1, the BLE communication is established between the mobile phone 10 and the printer 50, using the random address included in the advertising packet. Then, after the BLE communication is disconnected, the OS 32 may reestablish the BLE communication by using the random address. Nonetheless, as described above, the random address is periodically updated. Therefore, when the random address is updated by the printer 50, the OS 32 is unable to establish the BLE communication by using the stored random address. In this case, the OS 32 needs to again receive an advertising packet from the printer 50 and establish the BLE communication by using a random address included in the received advertising packet.

However, even though receiving from the application 30 an instruction to disconnect the BLE communication with the printer 50, the OS 32 may fail to disconnect the BLE communication for some reasons. Further, the printer 50 halts transmission of an advertising packet while the BLE communication is being established. Thus, there may be a case where the OS 32 fails to receive an advertising packet from an intended printer 50 in an attempt to reestablish the BLE communication with the intended printer 50.

More specifically, for instance, even though the application 30 provides the OS 32 with an instruction to disconnect BLE communication which the OS 32 has established between the mobile phone 10 and the printer 50a, when the BLE communication is not successfully disconnected, the printer 50a does not transmit an advertising packet. Therefore, in this case, the OS 32 is unable to receive a new advertising packet from the printer 50a. Nonetheless, when the BLE communication is disconnected for a reason such as time-out, the printer 50a transmits an advertising packet. Namely, the OS 32 is unable to receive a new advertising packet from the printer 50a until the BLE communication between the mobile phone 10 and the printer 50a is disconnected, for example, in response to occurrence of time-out. Hence, it takes a long period of time to reestablish the BLE communication with the printer 50a.

Further, as described above, the advertising packet is updated after a lapse of 15 minutes since disconnection of the BLE communication with the printer 50. Namely, even though the application 30 transmits an instruction to disconnect the BLE communication with the printer 50a, when the BLE communication is not successfully disconnected, the advertising packet is not updated by the printer 50a. Therefore, in this case, the OS 32 is highly likely to successfully reestablish the BLE communication with the printer 50a by using the stored random address. Thus, in the mobile phone 10, when the OS 32 is unable to receive a new advertising packet from the intended printer 50 in the attempt to reestablish the BLE communication with the intended printer 50, the OS 32 may reestablish the BLE communication by using the stored random address. Meanwhile, when the OS 32 is allowed to receive a new advertising packet from the intended printer 50 in the attempt to reestablish the BLE communication with the intended printer 50, the OS 32 may reestablish the BLE communication by using a random address included in the newly received advertising packet.

The mobile phone 10 is configured to preferentially perform the BLE communication using the stored random address in accordance with a user's intention, regardless of whether there is a new advertising packet received from the intended printer 50 in the attempt to reestablish the BLE communication with the intended printer 50. Specifically, in the mobile phone 10, the application 30 causes the display 16 to display a setting screen (not shown), via which the user may set a setting (hereinafter referred to as a "stored random address prioritized setting") for preferentially performing the BLE communication using the stored random address. The application 30 stores, into the data storage area 34, information representing whether the stored random address prioritized setting is valid, in accordance with the setting accepted via the setting screen. Then, when the stored random address prioritized setting is set valid, the OS 32 attempts to preferentially perform the BLE communication using the stored random address, regardless of whether there is a new advertising packet received from the intended printer 50 in the attempt to reestablish the BLE communication with the intended printer 50. When failing to reestablish the BLE communication using the stored random address despite the stored random address prioritized setting being set valid, the OS 32 attempts to reestablish the BLE communication depending on whether there is a new advertising packet received from the intended printer 50.

Further, the user may set, via the setting screen, a setting (hereinafter referred to as an "effective-period-based setting") for reestablishment of the BLE communication based on an effective period of the random address. The application 30 stores, into the data storage area 34, information representing whether the effective-period-based setting is valid, in accordance with the setting accepted via the setting screen. Specifically, when the effective-period-based setting is set valid via the setting screen, the mobile phone 10 acquires, from the printer 50, information (hereinafter referred to as "effective period information") representing the effective period during which the random address is effective. Then, the mobile phone 10 determines whether the present time is within the effective period of the stored random address (i.e., whether the stored random address is still effective), based on the effective period information. At this time, when the present time is determined to be within the effective period of the stored random address, the random address is not updated by the printer 50. Hence, it is possible to establish the BLE communication using the stored random address. Thus, when determining that the present time is within the effective period of the stored random address, the OS 32 attempts to perform the BLE communication using the stored random address. Meanwhile, when determining that the present time is not within the effective period of the stored random address (i.e., when the effective period has expired), the OS 32 attempts to reestablish the BLE communication in accordance with whether there is a new advertising packet received from the intended printer 50.

It is noted that both the stored random address prioritized setting and the effective-period-based setting may be concurrently set valid via the setting screen. In this case, the OS 32 attempts to preferentially perform the BLE communication using the stored random address, with higher priority to the stored random address prioritized setting.

Hereinafter, referring to a series of sequence diagrams shown in FIGS. 2 to 6, an explanation will be provided of a procedure to reestablish the BLE communication with the intended printer 50 in accordance with conditions such as whether there is an advertising packet received from the intended printer 50, the stored random address prioritized setting, and the effective-period-based setting.

Figure 2:
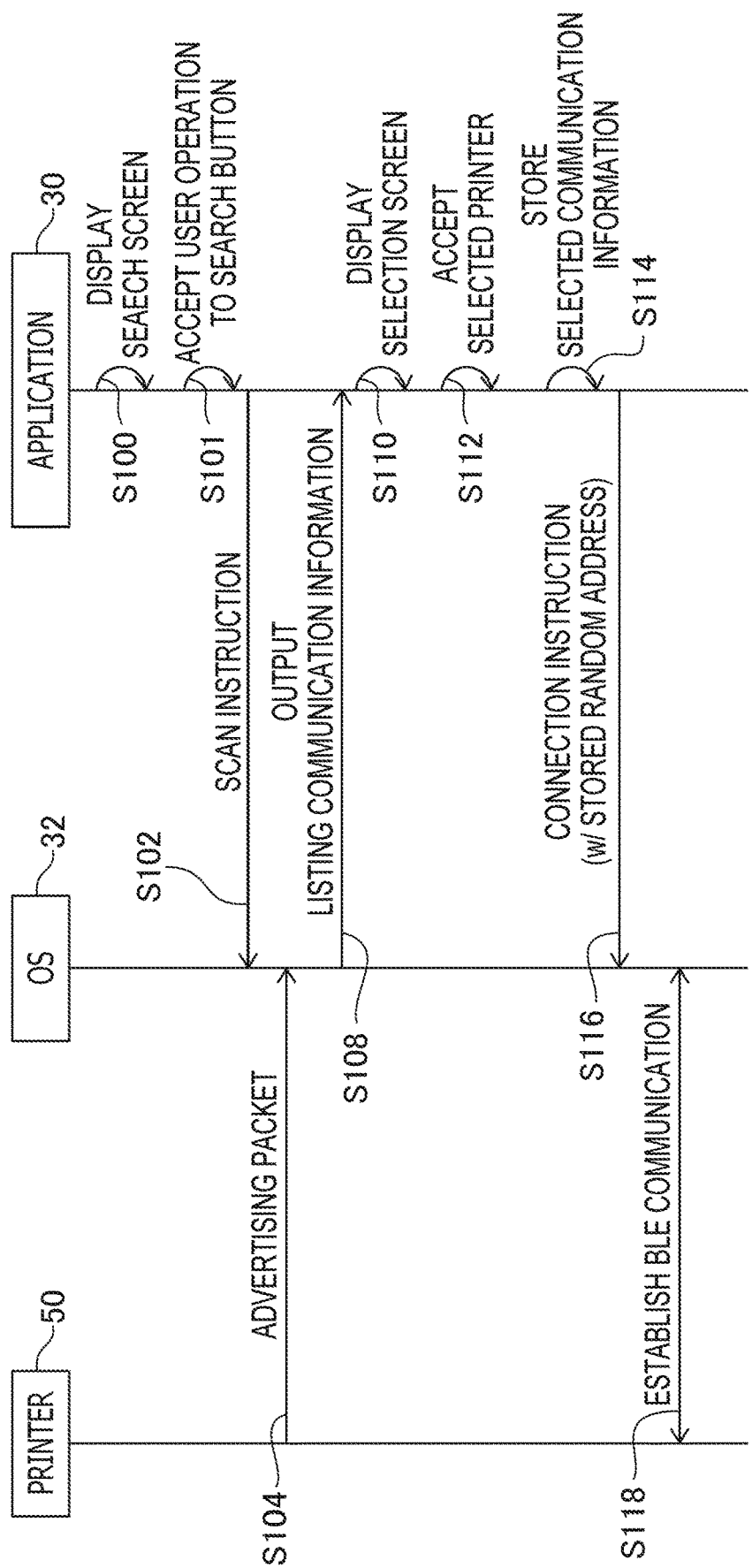
FIGS. 2 to 6 are sequence diagrams showing a sequence of processes in the communication system of the illustrative embodiment according to one or more aspects of the present disclosure.

First, in the mobile phone 10, the application 30 causes the display 16 to display a search screen (not shown) for searching for one or more printers 50 communicable with the mobile phone 10 (S100 in FIG. 2). The search screen includes a search button displayed thereon. When the user operates the search button, the application 30 accepts the user operation to the search button (S101). Then, the application 30 provides the OS 32 with a scan instruction (S102). Thereby, the OS 32 is brought into the scan state, and receives an advertising packet from each printer 50 which is positioned within a communicable range of the BLE communication with the mobile phone 10 (S104). It is noted that hereinafter, the random address and the local name included in the advertising packet may be collectively referred to as "communication information."

Subsequently, each time receiving an advertising packet from a printer 50, the OS 50 provides the application 30 with the received advertising packet as listing communication information (S108). Specifically, when the mobile phone 10 is connectable with the printers 50*a*, 50*b*, and 50*c* via the BLE communication, in response to receiving an advertising packet from the printer 50*a*, the OS 32 provides the application 30 with the advertising packet received from the printer 50*a*. Further, in response to receiving an advertising packet from the printer 50*b*, the OS 32 provides the application 30 with the advertising packet received from the printer 50*b*. Likewise, in response to receiving an advertising packet from the printer 50*c*, the OS 32 provides the application 30 with the advertising packet received from the printer 50*c*.

Then, after receipt of the listing communication information, the application 30 causes the display 16 to display a selection screen (not shown) based on the received listing communication information (S110). On the selection screen, the local names included in the listing communication information are displayed. An intended one of the printers 50*a*, 50*b*, and 50*c* is selected by a user operation via the selection screen, based on the local names displayed on the selection screen. Specifically, when the mobile phone 10 receives the advertising packets from the three printers 50*a*, 50*b*, and 50*c*, the respective local names of the three printers 50*a*, 50*b*, and 50*c* are displayed on the display 16. Then, an intended printer is selected from among the three printers 50*a*, 50*b*, and 50*c* by a user operation of specifying one of the local names displayed on the display 16. Thus, the application 30 accepts the user operation of selecting the intended printer (hereinafter referred to as the "selected printer") (S112).

Then, the application 30 stores, into the data storage area 34, the random address and the local name included in the communication information (hereinafter referred to as "selected communication information") of the selected printer (S114). The following description will be provided under an assumption that the printer 50*a* is the selected printer. Then, the application 30 provides the OS 32 with a connection instruction to connect the mobile phone 10 with the selected printer by using the stored random address (i.e., the random address stored in the data storage area 34) (S116). In response to receiving the connection instruction, the OS 32 transmits, to the selected printer, a connection request for connecting the mobile phone 10 with the selected printer by using the stored random address, thereby establishing the BLE communication with the selected printer (S118).

Figure 3:
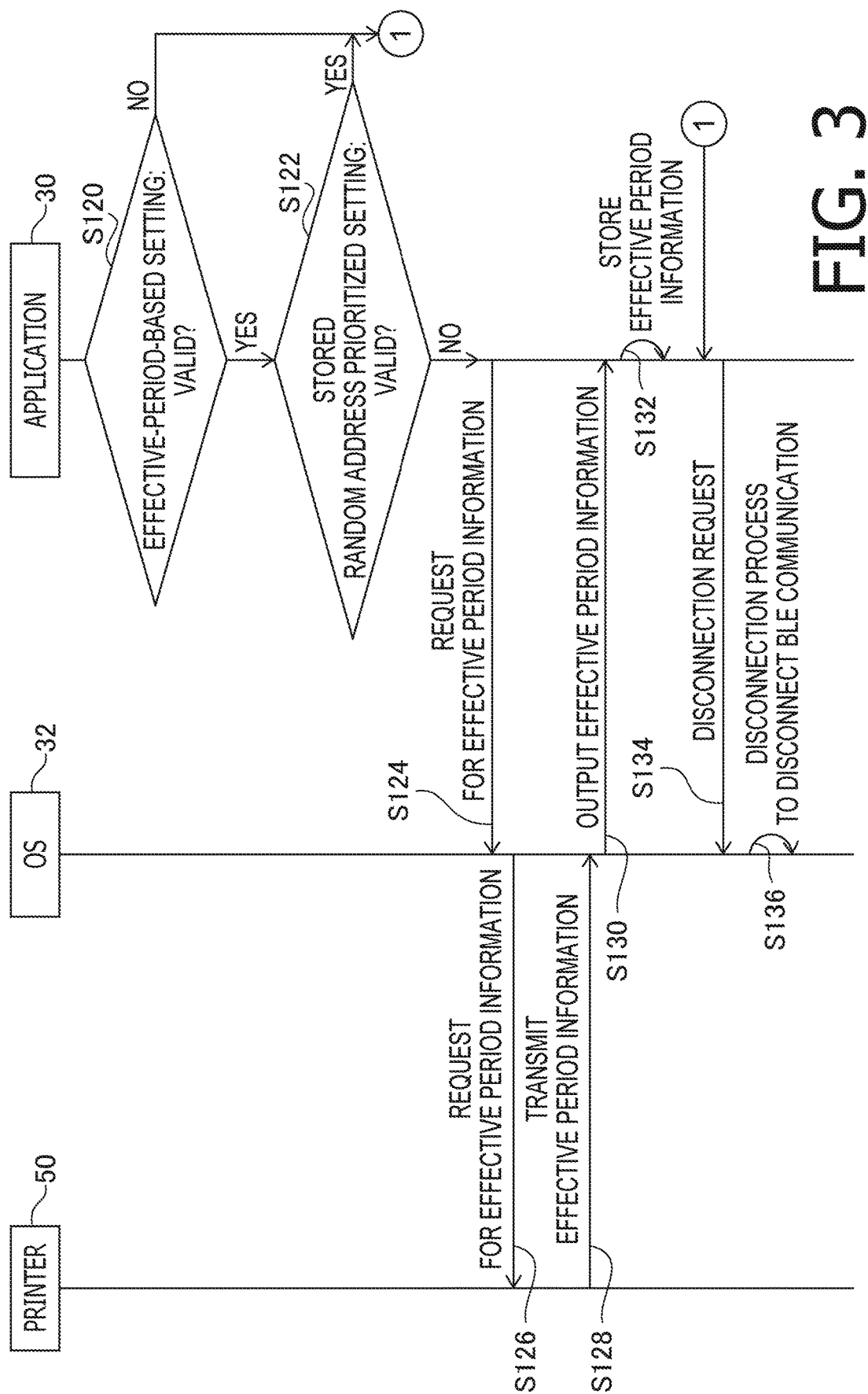

Subsequently, referring to the data storage area 34, the application 30 determines whether the effective-period-based setting is set valid (S120 in FIG. 3). When determining that the effective-period-based setting is set valid (S120: Yes), the application 30 determines whether the stored random address prioritized setting is set valid, with reference to the data storage area 34 (S122). At this time, when determining that the stored random address prioritized setting is set valid (S122: No), the application 30 provides the OS 32 with a request for the effective period information (S124). This is because a higher priority is assigned to the stored random address prioritized setting than to the effective-period-based setting. More specifically, as described above, when both the stored random address prioritized setting and the effective-period-based setting are concurrently set valid, the OS 32 attempts to preferentially perform the BLE communication using the stored random address. Thus, in such a case, the effective period information is unnecessary. Meanwhile, the effective period information is required when only the effective-period-based setting is set valid.

Subsequently, in response to receiving the request for the effective period information from the application 30, the OS 32 transmits the request for the effective period information to the selected printer via the BLE communication established in S118 (S126). In response to the request for the effective period information, the selected printer transmits the effective period information to the OS 32 (S128). The OS 32 provides the effective period information to the application 30 (S130). In response to receiving the effective period information, the application 30 stores the received effective period information into the data storage area 34 (S132). Afterward, the application 30 provides the OS 32 with an disconnection request (S134). Thereby, the OS 32 performs a disconnection process to disconnect the BLE communication with the selected printer (S136). When the effective-period-based setting is not set valid (S120: No), or the stored random address prioritized setting is set valid (S122: Yes), the communication system 1 performs S134 and S136 without executing any of the steps S124 to S132 for acquiring the effective period information.

As described above, the application 30 is a program for causing the selected printer to perform image formation. Therefore, the application 30 causes the display 16 to show a print execution screen (not shown) on which a print button is displayed. The print button is for starting the image formation. In response to accepting a user operation to the print button on the print execution screen (S200 in FIG. 4), the application 30 refers to the data storage area 34 and determines whether the stored random address prioritized setting is set valid (S202).

At this time, when the stored random address prioritized setting is set valid (S202: Yes), the application 30 provides the OS 32 with a communication instruction to perform the BLE communication using the stored random address (i.e., the random address of the selected communication information stored in S114) so as to reestablish the BLE communication according to the stored random address prioritized setting (S204). In response to receiving the communication instruction to perform the BLE communication, the OS 32 attempts to perform the BLE communication with the selected printer by using the stored random address. At this time, when the attempt is successful, the BLE communication is established between the mobile phone 10 and the selected printer (S206).

Then, when determining that the OS 32 has succeeded in the BLE communication with the selected printer by using the stored random address (S208: Yes), the OS 2 provides the application 30 with successful communication information representing the successful BLE communication with the selected printer (S210). Subsequently, in response to receiving the successful communication information from the OS 32, the application 30 provides the OS 32 with print image data (S212). In response to receiving the print image data, the OS 32 transmits the received print image data along with a print instruction, to the selected printer via the BLE communication (S214). Thereby, the selected printer performs a printing process to form an image based on the print image data received from the mobile phone 10 (S216).

Further, when determining that the stored random address prioritized setting is not set valid (S202: No), the application 30 determines whether the effective-period-based setting is set valid (S218 in FIG. 5). When determining that the effective-period-based setting is set valid (S218: Yes), the application 30 determines whether the present time is within the effective period of the stored random address, based on the effective period information stored in S132, in an attempt to reestablish the BLE communication according to the effective-period-based setting (S220). Specifically, for instance, the application 30 may make the determination in S220 by previously acquiring from the selected printer a next update time (e.g., a time after a lapse of 15 minutes since disconnection of the BLE communication) to update the random address as the effective period information, and determining whether the present time is earlier than the next update time represented by the effective period information. When determining that the present time is within the effective period of the stored random address (i.e., the effective period has not expired) (S220: Yes), the application 30 provides the OS 32 with a communication instruction to perform the BLE communication using the stored random address (S204). Thereafter, the communication system 1 performs S206 and the following steps.

When determining that the effective-period-based setting is not set valid (S218: No) or that the present time is out of the effective period of the stored random address (i.e., the effective period has expired) (S220: No), the application 30 provides the OS 32 with a scan instruction, in an attempt to reestablish the BLE communication depending on whether there is an advertising packet received from the selected printer (S222). When the OS 32 has failed in the BLE communication with the selected printer by using the stored random address (S208: No), i.e., when the OS 32 has failed to reestablish the BLE communication according to the stored random address prioritized setting or to reestablish the BLE communication according to the effective-period-based setting, the application 30 provides the OS 32 with a scan instruction, in an attempt to reestablish the BLE communication depending on whether there is an advertising packet received from the selected printer (S222).

In response to receiving the scan instruction, the OS 32 is brought into the scan state and receives an advertising packet from a printer 50 when the mobile phone 10 is within the communicable range of the BLE communication with the printer 50 (S224). Each time receiving an advertising packet from a printer 50, the OS 32 provides the application 30 with the received advertising packet as listing communication information (S226). Subsequently, the application 30 determines whether the local name of the selected printer (i.e., the local name stored in S114) exists among local names included in the received advertising packets (S228 in FIG. 6).

When the local name of the selected printer exists among the local names included in the received advertising packets (S228: Yes), it is determined that the OS 32 has received an advertising packet from the selected printer. In other words, it is determined that after disconnecting the BLE communication between the mobile phone 10 and the selected printer in S136, the OS 32 has received an advertising packet transmitted by the selected printer. Therefore, the application 30 provides the OS 32 with a communication instruction to perform the BLE communication using a random address (hereinafter referred to as an "updated random address) of the selected printer that is included in the listing communication information received in S226 (S230).

In response to receiving the communication instruction to perform the BLE communication, the OS 32 attempts to perform the BLE communication with the selected printer by using the updated random address. At this time, when the attempt is successful, the BLE communication is established between the mobile phone 10 and the selected printer (S232). Then, when determining that the OS 32 has succeeded in the BLE communication with the selected printer by using the updated random address (S234: Yes), the OS 32 provides the application 30 with the successful communication information (S210). Thereafter, the communication system 1 performs the steps S212 to S216. Meanwhile, when determining that the OS 32 has failed in the BLE communication with the selected printer (S234: No), the OS 32 provides the application 30 with unsuccessful communication information representing the unsuccessful BLE communication with the selected printer (S236). Then, the application 30 causes the display 16 to display an error screen (not shown) (S238).

Further, when the local name of the selected printer does not exist among the local names included in the received advertising packets (S228: No), it is determined that the OS 32 has not received an advertising packet from the selected printer. In other words, it is determined that since the OS 32 has failed to disconnect the BLE communication with the selected printer in S136, and the selected printer has not transmitted an advertising packet, the OS 32 has not received an advertising packet from the selected printer. In this case, first, the application 30 determines whether the stored random address prioritized setting is set valid, with reference to the data storage area 34 (S239). When determining that the stored random address prioritized setting is set valid (S239: Yes), the application 30 causes the display 16 to display the error screen (S238). Meanwhile, when determining that the stored random address prioritized setting is not set valid (S239: No), the application 30 provides the OS 32 with a communication instruction to perform the BLE communication using the stored random address (S240).

In response to receiving the communication instruction to perform the BLE communication, the OS 32 attempts to perform the BLE communication with the selected printer by using the stored random address. At this time, when the attempt is successful, the BLE communication is established between the mobile phone 10 and the selected printer (S232). Then, when determining that the OS 32 has succeeded in the BLE communication with the selected printer by using the stored random address (S234: Yes), the OS 32 provides the application 30 with the successful communication information (S210). Thereafter, the communication system 1 performs the steps S212 to S216. Meanwhile, when determining that the OS 32 has failed in the BLE communication with the selected printer (S234: No), the OS 32 provides the application 30 with the unsuccessful communication information (S236). Then, the application 30 causes the display 16 to display the error screen (not shown) (S238).

Thus, in response to failing to receive an advertising packet from the selected printer (S228: No), the mobile phone 10 attempts to reestablish the BLE communication with the selected printer by using the stored random address (S240). Thereby, even when the OS 32 has failed to disconnect the BLE communication with the selected printer though the OS 32 received the disconnection request from the application 30, it is possible to establish the BLE communication between the mobile phone 10 and the selected printer without waiting for a time-out of the BLE communication.

Further, in order to reestablish the BLE communication in response to receipt of an advertising packet, the OS 32 needs to receive an advertising packet after disconnection of the BLE communication with the selected printer. On the other hand, when the stored random address prioritized setting is set valid (S202: Yes), the OS 32 may reestablish the BLE communication with the selected printer by using the stored random address without receiving an advertising packet, after disconnection of the BLE communication with the selected printer. Thereby, it is possible to quickly reestablish the BLE communication with the selected printer.

Further, when the effective-period-based setting is set valid (S218: Yes), it is determined whether the present time is within the effective period of the stored random address (S220). When the present time is within the effective period of the stored random address (S220: Yes), the BLE communication with the selected printer is reestablished using the stored random address (S204). Thus, it is possible to certainly reestablish the BLE communication with the selected printer without receiving an advertising packet.

Hereinabove, the illustrative embodiment according to aspects of the present disclosure has been described. Aspects of the present disclosure may be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that aspects of the present disclosure may be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that aspects of the present disclosure are capable of use in various other combinations and environments and are capable of changes or modifications within the scope of the inventive concept as expressed herein. For instance, the following modifications according to aspects of the present disclosure are feasible.

In the aforementioned illustrative embodiment, the mobile phone 10 performs the BLE communication with a printer 50. Nonetheless, exemplary apparatuses connectable with the mobile phone 10 via the BLE communication may include, but are not limited to, an image processing apparatus having an image processing function such as an image scanning function and a facsimile function, and various apparatuses having other functions.

Figure 4:
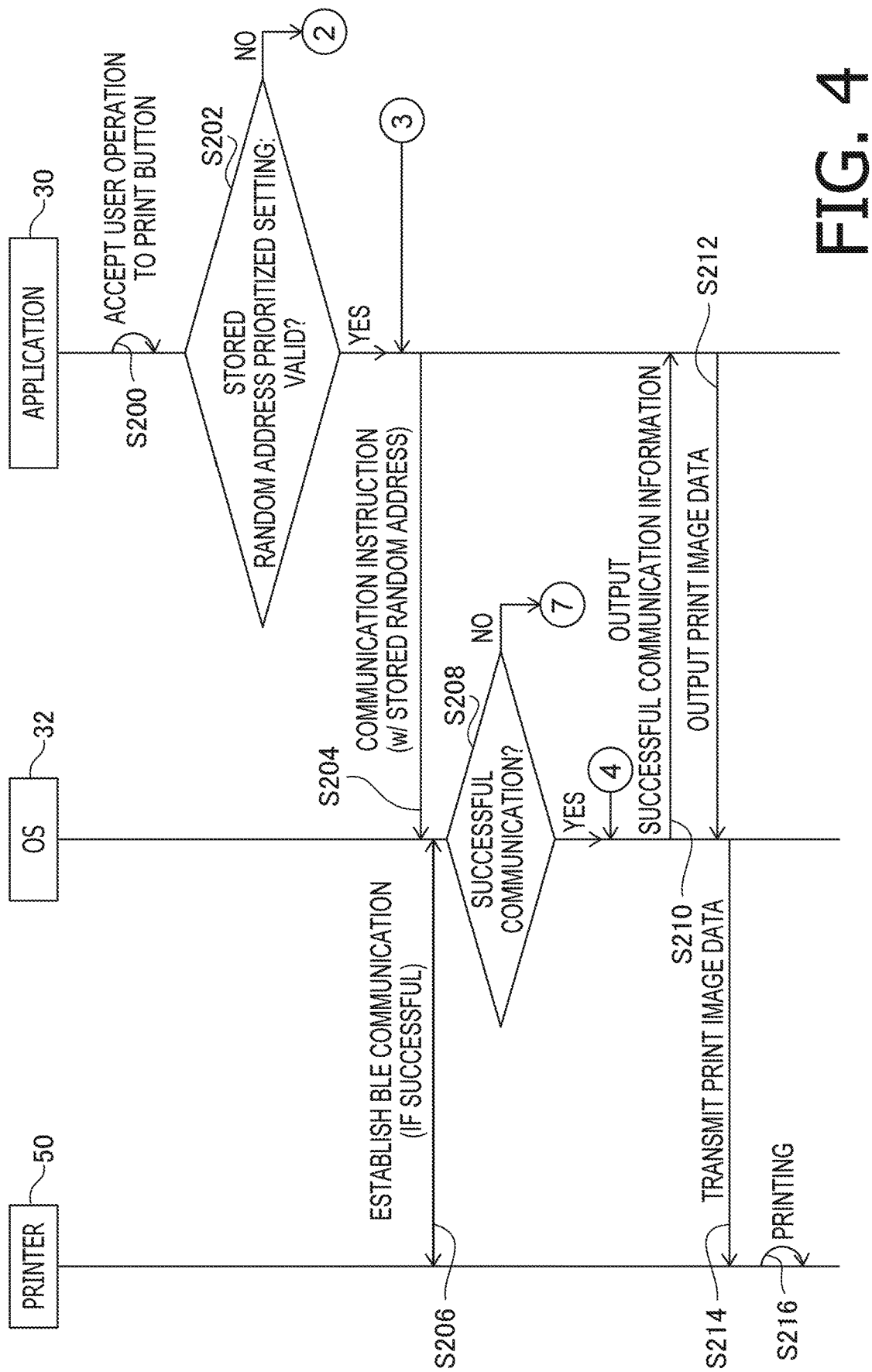
Figure 5:
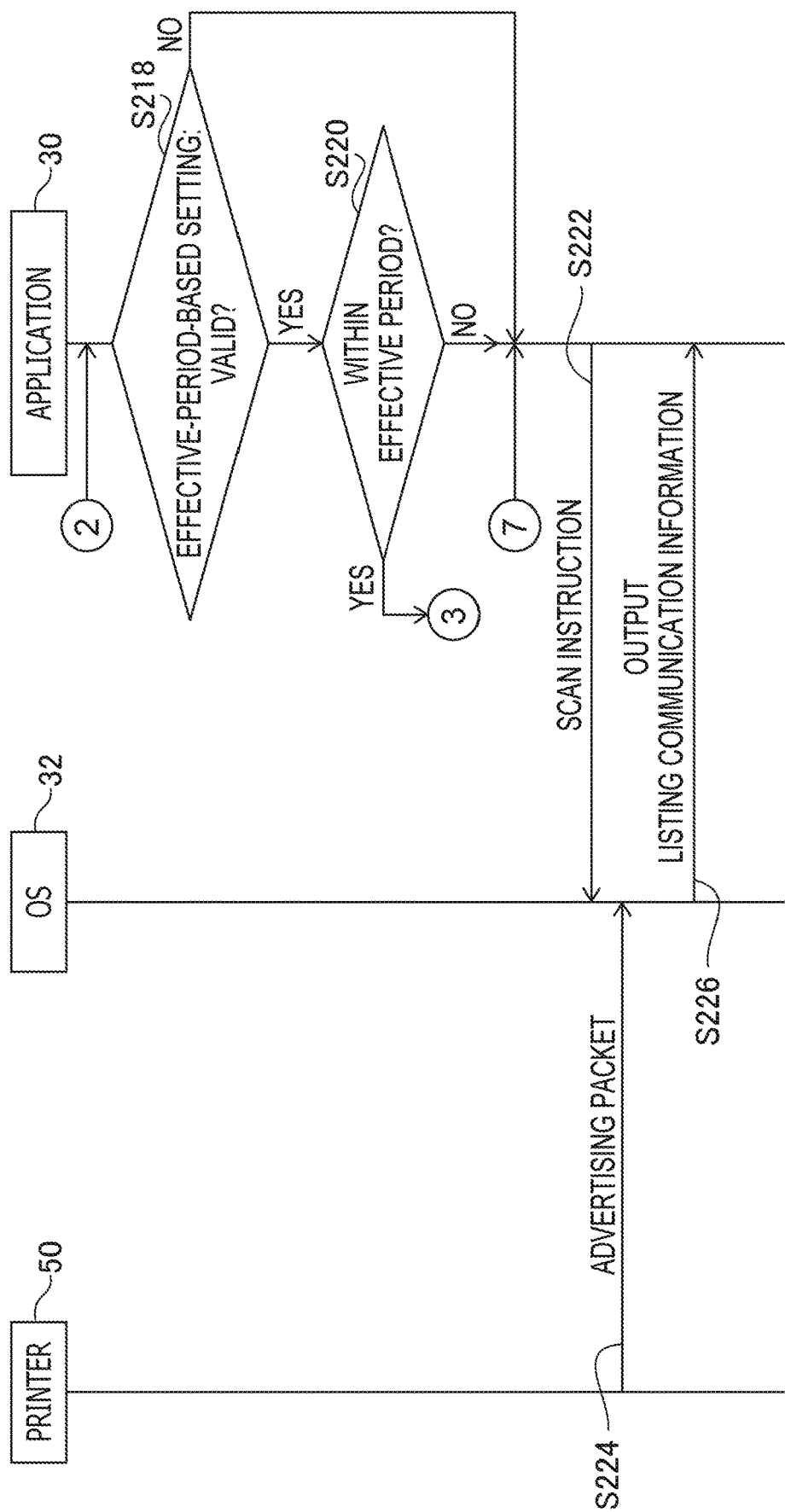
Figure 6:
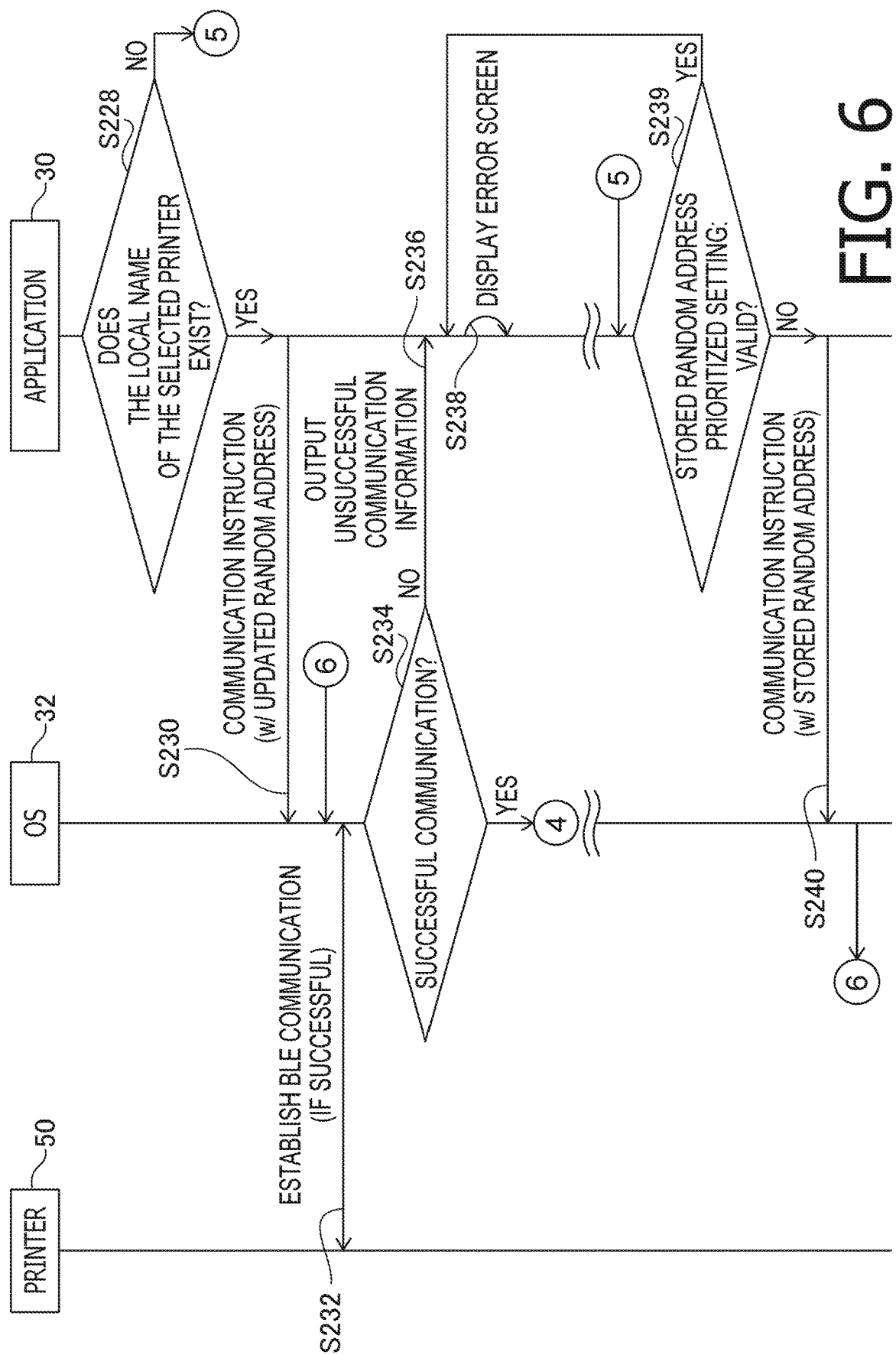

In the aforementioned illustrative embodiment, as shown in FIGS. 4 and 5, in response to acceptance of a user operation to the print button in S200, the communication system 1 performs the steps S202 to S220. Nonetheless, the communication system 1 may perform S222 immediately in response to acceptance of the user operation to the print button in S200, without performing any of the steps S202 to S220.

In the aforementioned illustrative embodiment, when both the stored random address prioritized setting and the effective-period-based setting are concurrently set valid, a higher priority is assigned to the stored random address prioritized setting than to the effective-period-based setting. However, the effective-period-based setting may be prioritized over the stored random address prioritized setting.

In the aforementioned illustrative embodiment, the mobile phone 10 transmits a print instruction along with print image data to the selected printer via the established BLE communication. Nonetheless, examples of information transmittable via the BLE communication are not limited to print image data but may include various types of information.

In the aforementioned illustrative embodiment, the BLE communication has been exemplified as an applicable communication method. Nonetheless, any type of communication method using a randomly-updated address may be applied to aspects of the present disclosure.

In the aforementioned illustrative embodiment, as exemplified with reference to FIGS. 2 to 6, the processes to be executed on the mobile phone 10 are performed by the CPU 12. Nonetheless, the processes to be executed on the mobile phone 10 may be performed by another logic integrated circuit such as an ASIC. In another instance, at least two of CPUs and other logic integrated circuits such as ASICs may perform those processes in cooperation with each other.

Associations between elements exemplified in the aforementioned illustrative embodiments and elements according to aspects of the present disclosure will be exemplified below. The mobile phone 10 may be an example of a "communication terminal" according to aspects of the present disclosure. The CPU 12 may be an example of a "processor" according to aspects of the present disclosure. The memory 14 may be an example of a "non-transitory computer-readable medium" according to aspects of the present disclosure. The application 30 may be an example of "computer-readable instructions" according to aspects of the present disclosure. The CPU 12 may be an example of a "controller" according to aspects of the present disclosure. Further, the memory 14 may be included in the "controller" according to aspects of the present disclosure. The short-range wireless communication I/F 22 may be an example of a "communication interface" according to aspects of the present disclosure. The input I/F 18 may be an example of a "user interface" according to aspects of the present disclosure. The printers 50*a*, 50*b*, and 50*c* may be included in "one or more communication devices" according to aspects of the present disclosure. The random address included in the advertising packet received from each printer 50 may be an example of "identification information" according to aspects of the present disclosure. The stored random address (i.e., the random address received from the selected printer and stored into the data storage area 34) may be an example of "first identification information" according to aspects of the present disclosure. The updated random address (i.e., the random address transmitted by the selected printer after disconnection of the BLE communication with the selected printer) may be an example of "second identification information" according to aspects of the present disclosure. The local name included in the advertising packet received from each printer 50 may be an example of "discrimination information" according to aspects of the present disclosure. The local name received from the selected printer and stored into the data storage area 34 may be an example of "first discrimination information" according to aspects of the present disclosure. The local name transmitted by the selected printer after disconnection of the BLE communication with the selected printer may be an example of "second discrimination information" according to aspects of the present disclosure.

What is claimed is:

1. A non-transitory computer-readable medium storing computer-readable instructions that are executable by a processor coupled with a communication terminal comprising a communication interface and a memory, the instructions being configured to, when executed by the processor, cause the communication terminal to:
   receive identification information from one or more communication devices via the communication interface, each identification information being periodically updated by a corresponding one of the one or more communication devices;
   receive discrimination information from the one or more communication devices via the communication interface, the discrimination information being not periodically updated;
   store first identification information into the memory, the first identification information being the identification information received from a specified one of the one or more communication devices;
   store first discrimination information into the memory, the first discrimination information being the discrimination information received from the specified communication device;
   perform communication with the specified communication device via the communication interface by using the first identification information stored in the memory;
   after disconnection of the communication using the first identification information, determine whether to use the first identification information or second identification information to reestablish the communication with the specified communication device, the second identification information being identification information to be transmitted by the specified communication device after the disconnection of the communication;
   when determining to use the first identification information, reestablish the communication with the specified communication device by using the first identification information; and
   when determining to use the second identification information, reestablish the communication with the specified communication device by using the second identification information;
   after the disconnection of the communication using the first identification information, receive the identification information and the discrimination information from the one or more communication devices;
   determine whether the discrimination information received after the disconnection of the communication includes second discrimination information identical to the first discrimination information stored in the memory, the second discrimination information being discrimination information to be transmitted by the specified communication device after the disconnection of the communication;
   when determining that the discrimination information received after the disconnection of the communication includes the second discrimination information, determine to use the second identification information to reestablish the communication with the specified communication device; and
   when determining that the discrimination information received after the disconnection of the communication does not include the second discrimination information, determine to use the first identification information to reestablish the communication with the specified communication device.

2. The non-transitory computer-readable medium according to claim 1,
   wherein the communication terminal further comprises a user interface configured to accept a priority setting for using the first identification information more preferentially than the second identification information, and
   wherein the instructions are further configured to, when executed by the processor, cause the communication terminal to:
      when the priority setting is accepted via the user interface, determine to use the first identification information to reestablish the communication with the specified communication device.

3. The non-transitory computer-readable medium according to claim 1,
   wherein the instructions are further configured to, when executed by the processor, cause the communication terminal to:
      determine whether an effective period of the first identification information has expired, based on effective period information, the effective period information representing the effective period during which the first identification information is effective;
      when determining that the effective period of the first identification information has not expired, determine to use the first identification information to reestablish the communication with the specified communication device; and
      when determining that the effective period of the first identification information has expired, determine to use the second identification information to reestablish the communication with the specified communication device.

4. The non-transitory computer-readable medium according to claim 3, wherein the instructions are further configured to, when executed by the processor, cause the communication terminal to receive the effective period information from the specified communication device via the communication interface.

5. The non-transitory computer-readable medium according to claim 1,
wherein the communication interface is configured to perform wireless communication with the one or more communication devices in accordance with a Bluetooth Low Energy protocol, and
wherein each identification information is included in an advertising packet transmitted by a corresponding one of the one or more communication devices.

6. A communication terminal comprising:
a communication interface;
a memory; and
a controller configured to:
receive identification information from one or more communication devices via the communication interface, each identification information being periodically updated by a corresponding one of the one or more communication devices;
receive discrimination information from the one or more communication devices via the communication interface, the discrimination information being not periodically updated;
store first identification information into the memory, the first identification information being the identification information received from a specified one of the one or more communication devices;
store first discrimination information into the memory, the first discrimination information being the discrimination information received from the specified communication device;
perform communication with the specified communication device via the communication interface by using the first identification information stored in the memory;
after disconnection of the communication using the first identification information, determine whether to use the first identification information or second identification information to reestablish the communication with the specified communication device, the second identification information being identification information to be transmitted by the specified communication device after the disconnection of the communication;
when determining to use the first identification information, reestablish the communication with the specified communication device by using the first identification information; and
when determining to use the second identification information, reestablish the communication with the specified communication device by using the second identification information;
after the disconnection of the communication using the first identification information, receive the identification information and the discrimination information from the one or more communication devices;
determine whether the discrimination information received after the disconnection of the communication includes second discrimination information identical to the first discrimination information stored in the memory, the second discrimination information being discrimination information to be transmitted by the specified communication device after the disconnection of the communication;
when determining that the discrimination information received after the disconnection of the communication includes the second discrimination information, determine to use the second identification information to reestablish the communication with the specified communication device; and
when determining that the discrimination information received after the disconnection of the communication does not include the second discrimination information, determine to use the first identification information to reestablish the communication with the specified communication device.

7. The communication terminal according to claim 6,
wherein the controller comprises:
a processor; and
a non-transitory computer-readable medium storing computer-readable instructions configured to, when executed by the processor, cause the controller to:
receive the identification information from the one or more communication devices via the communication interface;
store the first identification information into the memory;
perform the communication with the specified communication device via the communication interface by using the first identification information;
after the disconnection of the communication using the first identification information, determine whether to use the first identification information or the second identification information to reestablish the communication with the specified communication device;
when determining to use the first identification information, reestablish the communication with the specified communication device by using the first identification information; and
when determining to use the second identification information, reestablish the communication with the specified communication device by using the second identification information.

8. A method implementable on a processor coupled with a communication terminal comprising a communication interface and a memory, the method comprising:
receiving identification information from one or more communication devices via the communication interface, each identification information being periodically updated by a corresponding one of the one or more communication devices;
receiving discrimination information from the one or more communication devices via the communication interface, the discrimination information being not periodically updated;
storing first identification information into the memory, the first identification information being the identification information received from a specified one of the one or more communication devices;
storing first discrimination information into the memory, the first discrimination information being the discrimination information received from the specified communication device;
performing communication with the specified communication device via the communication interface by using the first identification information stored in the memory;

after disconnection of the communication using the first identification information, determining whether to use the first identification information or second identification information to reestablish the communication with the specified communication device, the second identification information being identification information to be transmitted by the specified communication device after the disconnection of the communication;

when determining to use the first identification information, reestablishing the communication with the specified communication device by using the first identification information; and when determining to use the second identification information, reestablishing the communication with the specified communication device by using the second identification information;

after the disconnection of the communication using the first identification information, receiving the identification information and the discrimination information from the one or more communication devices;

determining whether the discrimination information received after the disconnection of the communication includes second discrimination information identical to the first discrimination information stored in the memory, the second discrimination information being discrimination information to be transmitted by the specified communication device after the disconnection of the communication;

when determining that the discrimination information received after the disconnection of the communication includes the second discrimination information, determining to use the second identification information to reestablish the communication with the specified communication device; and when determining that the discrimination information received after the disconnection of the communication does not include the second discrimination information, determining to use the first identification information to reestablish the communication with the specified communication device.

* * * * *